(12) United States Patent
Ponnuswamy

(10) Patent No.: US 10,362,588 B2
(45) Date of Patent: *Jul. 23, 2019

(54) DETERMINING A THRESHOLD VALUE FOR DETERMINING WHETHER TO STEER A PARTICULAR NODE FROM ASSOCIATING WITH ONE NODE TO ANOTHER NODE IN A WIRELESS ENVIRONMENT

(71) Applicant: KodaCloud Inc., Campbell, CA (US)

(72) Inventor: Subbu Ponnuswamy, Saratoga, CA (US)

(73) Assignee: Koda Cloud Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/838,334

(22) Filed: Dec. 11, 2017

(65) Prior Publication Data
US 2018/0103401 A1 Apr. 12, 2018

Related U.S. Application Data

(63) Continuation of application No. 15/155,237, filed on May 16, 2016, now Pat. No. 9,877,245.

(51) Int. Cl.
*H04W 72/08* (2009.01)
*H04L 12/26* (2006.01)
*H04W 36/00* (2009.01)
*H04W 84/12* (2009.01)

(52) U.S. Cl.
CPC ........... *H04W 72/085* (2013.01); *H04L 43/16* (2013.01); *H04W 36/00837* (2018.08); *H04W 84/12* (2013.01)

(58) Field of Classification Search
CPC .................................................. H04W 72/085
See application file for complete search history.

(56) References Cited

U.S. PATENT DOCUMENTS

| 9,264,353 | B2 | 2/2016 | Krishnaswamy et al. |
| 9,713,034 | B2 | 7/2017 | Moller |
| 9,755,954 | B2 | 9/2017 | Long |
| 9,762,495 | B1 | 9/2017 | Chen et al. |

*Primary Examiner* — Samina F Choudhury
(74) *Attorney, Agent, or Firm* — Invoke

(57) ABSTRACT

Techniques are disclosed for determining a threshold value for determining whether to steer a particular node (such as, a client device) from one node (such as, an access point ((AP)) to another node (such as, another AP). A particular node associated with a current node in a wireless environment is identified. One or more parameters associated with the particular node, the current node, a candidate node to which the particular node may be steered, and/or the wireless environment is identified. Based on the parameters, a threshold value is determined. The threshold value is the minimum improvement in quality of one or more links if the particular node is steered from the current node to the candidate node. If the improvement in quality is greater than the determined threshold value, then the particular node is steered to associate with the candidate node rather than the current node.

20 Claims, 9 Drawing Sheets

DETERMINING A THRESHOLD VALUE FOR DETERMINING WHETHER TO STEER A PARTICULAR NODE FROM ASSOCIATING WITH ONE NODE TO ANOTHER NODE IN A WIRELESS ENVIRONMENT

PRIORITY CLAIM; INCORPORATION BY REFERENCE

This application is a Continuation of U.S. application Ser. No. 15/155,237 filed on May 16, 2016, the entire content of which is hereby incorporated by reference in its entirety.

TECHNICAL FIELD

The present disclosure relates to associations between nodes in a wireless environment. In particular, the present disclosure relates to determining a threshold value for determining whether to steer a particular node from associating with one node to another node in a wireless environment.

BACKGROUND

In recent years, Wireless Local Area Network (WLAN) technologies have emerged as a fast-growing market. Among the various WLAN technologies, the Institute of Electrical and Electronics Engineers (IEEE) 802.11 standard is the dominating technology and is frequently used for WLANs. The IEEE 802.11 standard includes operations in one or more bands (such as the 2.400-2.500 GHz band and/or the 4.915-5.825 GHz band), and multiple channels within each band. Additional WLAN technologies include mesh networking, peer-to-peer networking, a network of devices within an Internet of Things (IoT) environment, and a network of inter-vehicle communication nodes. Various WLAN technologies may be used in conjunction in a single wireless environment.

Nodes within WLANs wirelessly communicate with other nodes. As an example, a WLAN may include a set of nodes that are client devices and a set of nodes that are network devices. A network device may be communicatively coupled to one or more network resources (e.g., the Internet, an intranet, etc.). The network device may be directly connected to a network resource or connected via a controller. A client device may associate with a network device in order to transmit communications to a network resource and/or receive communications from a network resource. An example of a network device is a wireless access point (AP), which is a digital device that (a) communicates wirelessly with client devices using Wi-Fi, WiGig, Zigbee, Bluetooth or related standards and (b) communicates with another wired or wireless network.

As another example, a WLAN may include a set of nodes that are associated with each other. In a full mesh topology, for example, each node is associated directly to each other node. In a partial mesh topology, each node is associated directly to only a subset of nodes within the network. Each node serves to relay messages to the corresponding associated nodes.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
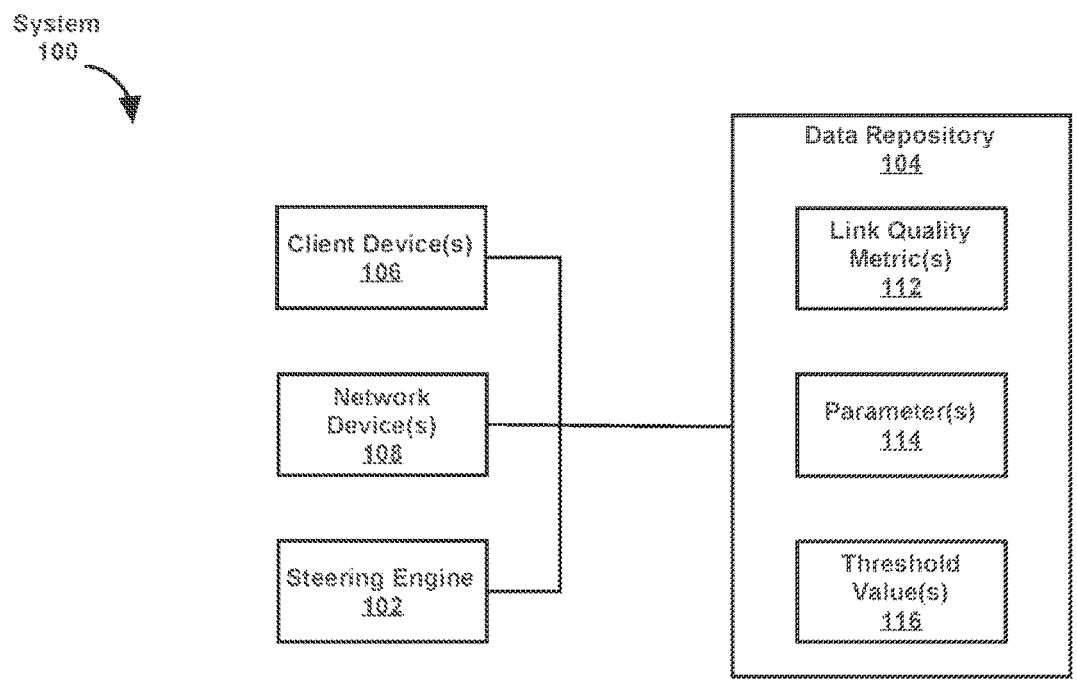
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

General Overview

One or more embodiments include determining a threshold value for determining whether to steer a particular node from associating with one node to another node. A client device associated with a particular AP in a wireless environment is identified. One or more parameters associated with the client device, the particular AP, a candidate AP to which the client device may be steered, and/or the wireless environment is identified. Based on the parameters, a threshold value is determined. The threshold value is the minimum improvement in quality of one or more links if the client device is steered from the particular AP to the candidate AP. The improvement in quality of the one or more links may be an improvement in quality of the link between the client device and the candidate AP, as compared to the link between the client device and the particular AP. Additionally or alternatively, the improvement in quality of the one or more links may be an improvement in the quality of a link between another client device and the particular AP, if the client device is steered. Additionally or alternatively, the improvement in quality of the one or more links may be an improvement in the aggregated quality of links between various client devices and various APs in the wireless environment, if the client device is steered. If the improvement in quality is greater than the determined threshold value, then the client device is steered to associate with the candidate AP rather than the particular AP.

One or more embodiments include determining different threshold values for different nodes (such as, client devices and/or APs). A particular threshold value is determined, based on a parameter associated with a particular client device, for determining whether to steer the particular client device from a particular AP to a candidate AP. A different threshold value is determined, based on a parameter associated with another client device, for determining whether to steer the other client device from the particular AP to the candidate AP. Additionally or alternatively, a particular threshold value is determined, based on a parameter associated with a particular AP, for determining whether to steer a particular client device from the particular AP to a candidate AP. A different threshold value is determined, based on a parameter associated with another AP, for determining whether to steer the particular client device from the other AP to the candidate AP.

In one or more embodiments, examples of parameters, used for determining a threshold value for steering a client device from a particular AP to a candidate AP, include but are not limited to: a performance parameter (such as a received signal strength and/or signal-to-noise ratio (SNR)) of a link between the client device and the particular AP; a performance parameter of a link between the client device and the candidate AP; an identity of the particular AP, the candidate AP, and/or the client device; a device type of the client device; a radio frequency (RF) density of the particular AP and/or the candidate AP; an operating RF channel of the particular AP, the candidate AP, and/or the client device; and a particular time period in which the steering may be performed (such as the time of day, or the day of week).

As described herein, any embodiment and/or example referring to a client device may be equally applied to a node within any type of wireless environment. Any embodiment and/or example referring to a network device and/or an AP may be equally applied to a node within any type of wireless environment. Hence, an example that illustrates steering a client device from associating with one AP to another AP may be understood as an example illustrating steering a particular node from associating with one node to another node in a wireless environment.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes client device(s) 106, network device(s) 108, a steering engine 102, and a data repository 104. In one or more embodiments, system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In an embodiment, system 100 may be implemented or executed as part of an Expert system, Rule-Based system, Self-Learning system, or Machine-Learning system, which implements Machine Intelligence or Artificial Intelligence techniques. System 100 may be executed and/or distributed on one or more network devices 110 that are local to a wireless environment provided by the network devices 110. Additionally or alternatively, system 100 may be executed and/or distributed on one or more digital devices that are remote from the wireless environment, such as a controller implemented in a cloud environment.

In one or more embodiments, system 100 may include one or more nodes. A node may be a network device 108, a client device 106, or another device (not illustrated). A node is any digital device that communicates with another node within system 100. As an example, a node may be a node in a mesh network, a peer-to-peer network, and/or a distributed network. As another example, a node may be an Internet of Things (IoT) device.

A particular node may be communicatively coupled to a network resource. Other nodes may associate with the particular node in order to communicate with the network resource. Additionally or alternatively, a particular node may relay a message from a first node to a second node. The first node and the second node are each associated with the particular node. The particular node receives the message from the first node. The particular node forwards the message to the second node. A message may traverse any number nodes before reaching a destination node.

In one or more embodiments, a network device 108 is a digital device that facilitates communications between a client device 106 and a network resource. A network device 108 may receive information from a client device 106 and transmit the information to a network resource. Additionally or alternatively, a network device 108 may receive information from a network resource and transmit the information to a client device 106.

The term "digital device" generally refers to any hardware device that includes a processor. A digital device may refer to a physical controller device or a hardware device executing a virtual controller. Examples of digital devices include a computer, a tablet, a laptop, a desktop, a netbook, a server, a web server, authentication server, an authentication-authorization-accounting (AAA) server, a Domain Name System (DNS) server, a Dynamic Host Configuration Protocol (DHCP) server, a Remote Authentication Dial-In User Service (RADIUS) server, a Lightweight Directory Access Protocol (LDAP) server, an Internet Protocol (IP) server, a Virtual Private Network (VPN) server, a network policy server, a mainframe, a television, a content receiver, a set-top box, a video gaming console, a printer, a mobile handset, a smartphone, a personal digital assistant (PDA), a wireless receiver and/or transmitter, a base station, a communication management device, a router, a switch, a cloud server, a cloud controller, a controller, and an Access Point (AP) (including a wireless AP).

A digital device may be a wireless device. A wireless device is configured to exchange information with another digital device, without being connected by an electrical conductor to the other digital device. A wireless device includes one or more radios that transmit and/or receive radio waves. Data may be encoded on a radio wave based on a communications protocol, such as the IEEE 802.11 standard. An example of a wireless network device is a wireless AP.

A network device 108 may be associated with one or more wireless configurations. Examples of wireless configurations of a network device 108 include but are not limited to a transmit power, a Modulation and Coding Scheme (MCS) or a Physical Layer (PHY) rate, a probe response threshold, a disassociate threshold, a receive sensitivity, a receive gain, a transmit cell size, a receive cell size, and a radio frequency (RF) channel.

In one or more embodiment, a client device 106 is configured to communicate wirelessly with a network device 108. A client device 106 may receive information from a network resource through a network device 108. Additionally or alternatively, a client device 106 may transmit information to a network resource through a network device 108.

As an example, a client device 106 may connect to a network resource through a network device 108. By connecting to the network resource, the client device 106 may receive web traffic, voice data streams, video data streams, and/or any other type of data.

As another example, a client device 106 may be located in a wireless environment without actively seeking to connect to a network resource. An Internet of Things (IoT) or Internet of Everything (IoE) environment may comprise a network of digital devices, each having particular functionality to sense, collect, monitor, detect, analyze, process, transmit, receive, and/or exchange data. An IoT or IoE device, operating in power-save mode, may not actively seek to connect to a network resource. The IoT or IoE device may periodically wake up to receive broadcast data from one or more network devices. The IoT or IoE device may use broadcast data to determine whether data addressed to the IoT or IoE device was transmitted within the prior period. The IoT or IoE device may connect to a network resource only upon a particular trigger.

A client device 106 may be associated with one or more wireless configurations. Examples of wireless configurations of a client device 106 include but are not limited to a RF channel, a transmit power, a transmit cell size, a receive cell size, a MCS or PHY rate, a retry rate, an aggregation size, and an association with a particular AP.

In one or more embodiments, data repository 104 is any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be implemented or may execute on the same computing system as steering engine 102. Alternatively or additionally, data repository 104 may be implemented or executed on a separate computing system than steering engine 102. Data repository 104 may be connected to steering engine 102 via a direct connection or via a network.

Data sets describing link quality metric(s) 112, parameter(s) 114, and threshold value(s) 116 may be implemented across any of components within system 100. However, the data set is illustrated within data repository 104 for purposes of clarity and explanation.

In one or more embodiments, a link quality metric 112 is a metric representing a quality of a link. A link is any relationship corresponding to a transmission of one or more wireless signals between two nodes (such as, a client device 106 and an AP), regardless of whether there is a wireless connection between the two nodes. Link quality metric 112 of a link between a particular client device 106 and a particular AP may be determined based on one of the factors listed below. Alternatively, link quality metric 112 of a link between a particular client device 106 and a particular AP may be determined based on a combination (such as, a weighted sum) of the factors listed below. The factors include:
  (a) a received signal strength indicator (RSSI) of a wireless signal transmitted between the client device and the particular AP;
  (b) a signal-to-noise ratio (SNR) of a wireless signal transmitted between the client device and the particular AP;
  (c) a maximum Modulation and Coding Scheme (MCS) or Physical Layer (PHY) rate that may be supported by the link (given a particular number of spatial streams);
  (d) a maximum rate at which data may be exchanged between the particular client device and the particular AP;
  (e) a packet error rate (PER) corresponding to the link;
  (f) a retry count corresponding to the link;
  (g) a maximum number of aggregated frames that may be supported by the link;
  (h) whether beam-forming is supported by the link;
  (i) whether Multi-User Multiple-Input and Multiple-Output (MU-MIMO) is supported by the link;
  (j) an amount of interference (such as co-channel interference, overlapping channel interference, and/or non-Wi-Fi interference) detected by the particular client device and/or the particular AP;
  (k) an application-specific quality associated with a particular application of the particular client device (such as a mean opinion score (MOS) of an audio or video stream, or a measure of delay or jitter of an audio or video stream);
  (l) a channel utilization of the particular AP; and
  (m) a client load of the particular AP.

A client load of a particular AP may be based on one or more of the following: a number of client devices associated with the particular AP, a typical usage of each client device associated with the particular AP, and/or the applications (or types of applications) being executed on each client device associated with the particular AP.

In one or more embodiments, a parameter 114 is an attribute or characteristic associated with node(s), client device(s) 106, network device(s) 108, and/or the wireless environment. Examples of parameters 114 include but are not limited to:
  (a) a performance parameter (such as a received signal strength and/or signal-to-noise ratio (SNR)) of a link between the client device and the current AP that the client device is associated with;
  (b) a performance parameter of a link between the client device and the candidate AP that the client device may be steered to associate with;
  (c) an identity of the current AP, the candidate AP, and/or the client device;
  (d) a device type of the client device;
  (e) a radio frequency (RF) density of the current AP and/or the candidate AP;
  (f) an operating RF channel of the current AP, the candidate AP, and/or the client device;
  (g) a client load (or client density) of the current AP and/or the candidate AP;
  (h) a particular time period in which the steering may be performed (such as the time of day, or the day of week).

One or more parameters 114 are used for determining a threshold value 116 for determining whether to steer a particular node from a current node to a candidate node. Examples of operations for determining a threshold value 116 based on parameters 114 is described below with reference to FIG. 2.

In one or more embodiments, a threshold value 116 is the minimum improvement in one or more link quality metrics 112 of links in a wireless environment, if a node (such as, client device 106) is steered from associating with a current node (such as, a current AP) to being associated with a candidate node (such as, a candidate AP). The improvement in link quality metrics 112 may be an improvement in a link quality metric 112 of the link between the client device 106 and the candidate AP, as compared to the link between the client device 106 and the particular AP. Additionally or alternatively, the improvement in link quality metrics 112 may be an improvement in a link quality metric 112 of a link between another client device 106 and the particular AP, if the client device 106 is steered. Additionally or alternatively, the improvement in link quality metrics 112 may be an improvement in the aggregated link quality metrics 112 of links between various nodes (such as, links between various client devices 106 and various APs) in the wireless environment, if the client device 106 is steered.

Threshold value 116 may be represented as a numeric value and/or a percentage. In an embodiment, threshold value 116 is a numeric value. A client device is associated with a particular AP. A current link quality metric 112 corresponds to a link between the client device and the particular AP. A candidate link quality metric 112 corresponds to a link between the client device and a candidate AP, to which the client device may be steered. The numeric value of threshold value 116 is used to determine whether to steer the client device from the particular AP to the candidate AP. The client device is steered, if the difference between the candidate link quality metric 112 and the current link quality metric 112 is greater than the numeric value. Expressed as a formula, the client device is steered if: $LQM_{candidate} > LQM_{current} + \text{Threshold}$, given that:

$LQM_{current}$=Link quality metric 112 before a client device is steered;

$LQM_{candidate}$=Link quality metric 112 after the client device is steered.

In an embodiment, threshold value 116 is a percentage. A client device is associated with a particular AP. A current link quality metric 112 corresponds to a link between the client device and the particular AP. A candidate link quality metric 112 corresponds to a link between the client device and a candidate AP, to which the client device may be steered. The percentage specified by threshold value 116 is used to determine whether to steer the client device from the particular AP to the candidate AP. The percentage specified by threshold value 116 refers to a percentage of the current link quality metric 112. The percentage is converted into a numeric value by multiplying the current link quality metric 112 by the percentage. The client device is steered, if the difference between the candidate link quality metric 112 and the current link quality metric 112 is greater than the numeric value. Using the same terms as above, the client device is steered if: $LQM_{candidate} > LQM_{current} + (\text{Threshold} \times LQM_{current})$.

Threshold value 116 is determined based on one or more parameters 114. Threshold value 116 corresponding to a particular client device and/or AP may be different from threshold value 116 corresponding to another client device and/or AP. Additionally, threshold value 116 for a particular client device, at a particular location, may change over time based on parameters 114.

In one or more embodiments, steering engine 102 refers to hardware and/or software configured to perform operations described herein for determining threshold value(s) 116 for determining whether to steer a particular node (such as, client device 106) from a current node (such as, a current AP) to a candidate node (such as, a candidate AP). Examples of operations for determining a threshold value 116 are described below with reference to FIG. 2.

Steering engine 102 is implemented on one or more nodes within system 100, such as network devices 110 and/or APs. Additionally or alternatively, steering engine 102 is implemented on one or more other digital devices, such as a cloud controller.

Figure 2:
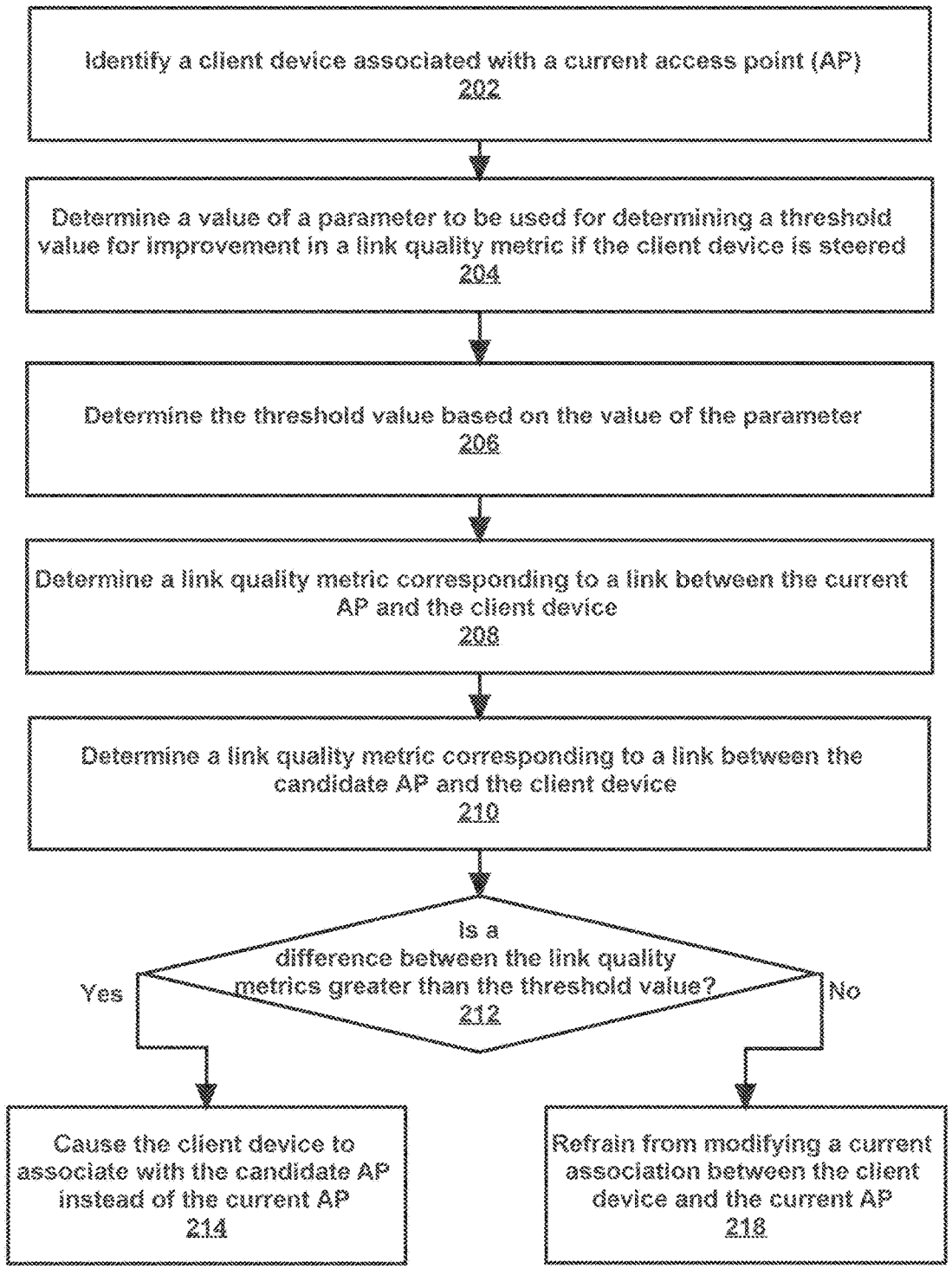
FIG. 2 illustrates an example set of operations for determining a threshold value for determining whether to steer a particular node from a current node to a candidate node, in accordance with one or more embodiments.

3. Determining a Threshold Value for Determining Whether to Steer a Particular Node from a Current Node to a Candidate Node FIG. 2 illustrates an example set of operations for determining a threshold value for determining whether to steer a particular node from one node to another node, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments. While FIG. 2 refers to client devices and access points (APs), the operations may additionally or alternatively be applied to any nodes within any type of wireless environment.

One or more embodiments include identifying a client device associated with a current access point (AP) (Operation 202). A client device associated with the current AP may be identified based on a log maintained by the current AP. The current AP updates the log to reflect the client devices which have completed particular connection stages, such as an 802.11 association stage, an 802.1x authentication stage, and/or a network address assignment stage. The log identifies a list of client devices associated with the current AP.

Additionally or alternatively, the client device associated with the current AP may be identified based on active data traffic being exchanged between the client device and the current AP. A frame or packet of data traffic exchanged between the client device and the current AP may be intercepted. A header of the intercepted message includes identifiers of a destination device and a source device. If the destination device and the source device correspond to the client device and the current AP, then the client device is identified as being associated with the current AP.

One or more embodiments include determining a value of a parameter to be used for determining a threshold value for an improvement in a link quality metric if the client device is steered from the current AP to a candidate AP (Operation 204). Various parameters, or a combination thereof, may be used.

A parameter may be a received signal strength indicator (RSSI) and/or a signal-to-noise ratio (SNR) of a wireless signal transmitted between the client device and the current AP. The client device transmits the wireless signal, which includes an identifier of the client device. The current AP receives the wireless signal. The current AP determines that the wireless signal was transmitted by the client device based on the identifier of the client device included in the wireless signal. The current AP determines a RSSI and/or SNR of the received wireless signal. Conversely, the current AP transmits the wireless signal. The client device determines a RSSI and/or SNR of the received wireless signal.

A parameter may be a received signal strength indicator (RSSI) and/or a signal-to-noise ratio (SNR) of a wireless signal transmitted between the client device and the candidate AP. The RSSI and/or SNR is determined as described above.

A parameter may be an identity of the current AP, the candidate AP, and/or the client device. The particular AP, the candidate AP, and/or the client device may transmit a message identifying itself.

A parameter may be a device type of the client device. The client device may transmit a message identifying a device type of the client device. The device type may be associated with a rate of mobility of the client device. As an example, if a client device is a printer, then the client device is stationary, or has a low rate of mobility. If a client device is a mobile phone, then the client device has a high rate of mobility. The device type and/or rate of mobility may be used in determining the threshold value.

A parameter may be a radio frequency (RF) density of the current AP and/or the candidate AP. The RF density is an indication of a number of APs in a particular area, and how close the APs are located to each other. The RF density of a particular AP is determined based on the number of APs that are within a particular RF distance from the particular AP. RF distance between a first AP and a second AP is defined by the link quality metric (or RSSI, or SNR) of a wireless signal, transmitted by the first AP, and detected by the second AP. Additionally or alternatively, the RF density of a particular AP is determined based on the ability of one or more client devices associated with the particular AP to communicate with other APs. For each client device associated with the particular AP, the number of other APs that receive a wireless signal from the client device with a link quality metric (or RSSI, or SNR) above a particular threshold value is determined. The number of other APs that receive wireless signals with the link quality metric above the particular threshold value is the RF density. The number of APs that receive a wireless signal from a particular client device may be determined in various ways. As an example, the information may be obtained directly from the particular client device (e.g., using an 802.11k neighbor report or a similar mechanism where the client device reports the APs it sees). As another example, the information may be inferred based on one or more probes sent by the particular client device (e.g., the number of APs that receive a probe from the particular client within a particular time window).

A parameter may be an operating RF channel of the current AP, the candidate AP, and/or the client device. A wireless device transmits a wireless signal indicating the operating RF channel. Additionally or alternatively, the operating RF channel of a wireless device is determined based on a frequency and/or bandwidth of one or more wireless signals transmitted by the wireless device.

A parameter may be a client load (or client density) of the current AP and/or the candidate AP. Client load of a particular AP is determined based on the number of client devices associated with the particular AP. Client load may be proportional to the inverse of the link quality metrics (or RSSI, SNR, or MSC) of the client devices associated with the particular AP. Expressed as a formula, $$\text{client density} = \sum_{i=1}^{N} \frac{1}{LQM_i}$$

where N=the number of client devices associated with the particular AP, and $LQM_i$ is the link quality metric corresponding to a link between each client device and the particular AP.

A parameter may be a particular time period in which the steering may be performed (such as the time of day, or the day of week). The particular time period may be determined based on a clock associated with the current AP, the candidate AP, and/or the client device.

A parameter may be a distance between the client device and the current AP and/or a distance between the client device and the candidate AP. The distance may be determined as a RF distance or a physical distance. A RF distance between two wireless devices is determined based on a link quality metric (or RSSI, or SNR) of a wireless signal, transmitted by one wireless device, and detected by the other wireless device. A physical distance between two wireless devices is determined based on a path loss model. Path loss is the reduction in power density (attenuation) of a wireless signal as the wireless signal propagates through space. Based on a difference between a transmit power and a received signal strength of a particular wireless signal, a physical distance between the transmitting wireless device and the receiving wireless device may be determined. A physical distance between two wireless devices may also be determined based on a Global Positioning System (GPS).

A value of a parameter may be detected and/or monitored in a wireless environment. Additionally or alternatively, a value of a parameter may be estimated and/or determined based on historical data and/or expected values.

One or more embodiments include determining the threshold value based on the value of the parameter (Operation 206). The threshold value may be a numeric value and/or a percentage.

The threshold value is determined using a function and/or graph. The function may accept one or more parameters as an input, and return the threshold value as an output. As an example, a function may accept a SNR of a wireless signal transmitted between a client device and a current AP. The function may output a threshold value that is proportional to the SNR. Based on a first SNR that is higher than a second SNR, the function may output a higher threshold value for the first SNR than for the second SNR.

As another example, a function may accept a RF density of a current AP and a RF density of a candidate AP as inputs. The function may compute a threshold value that is inversely proportional to the RF density corresponding to the current AP. Additionally, the function may compute a threshold value that is proportional to the RF density corresponding to the candidate AP. In an example, a first client device may be associated with a first AP. A first RF density of the first AP may be two. Based on the first RF density as an input, a function may output a first threshold value for steering the first client device from the first AP to a candidate AP. The first threshold value may be computed as 5%. Additionally, a second client device may be associated with a second AP. A second RF density of the second AP may be one. Based on the second RF density as an input, the function may output a second threshold value for steering the second client device from the second AP to the candidate AP. The second threshold value may be computed as 8%. This example demonstrates the inversely proportional relationship between (a) the RF density of a current AP and (b) the threshold value for steering a client device from the current AP to a candidate AP. Since the first RF density (two) is higher than the second RF density (one), the first threshold value (5%) is lower than the second threshold value (8%).

As another example, a function may accept a client load of a current AP and a client load of a candidate AP as inputs. The function may compute a threshold value that is inversely proportional to the client load corresponding to the current AP. Additionally, the function may compute a threshold value that is proportional to the client load corresponding to the candidate AP.

Additionally or alternatively, the threshold value is determined based on a mapping from one or more parameters. A set of rules may indicate that a particular parameter is to be mapped to a particular threshold value. The set of rules may be specified in any form, such as a table, or a set of logic statements. As an example, a set of rules may indicate that a client device with Identifier (ID) #01 maps to a particular threshold value. The set of rules may indicate that a client device with ID #02 maps to a different threshold value.

As another example, various different functions may be implemented for determining a threshold value for steering a client device from a current AP to a candidate AP. A first function may determine the threshold value based on an SNR. A second function may determine the threshold value based on a RF density and a time of day. A set of rules may map different client devices to different functions. The set of rules may indicate that a client device with ID #01 maps to using the first function for determining a threshold value. Additionally, the set of rules may indicate that a client device with ID #02 maps to using the second function for determining a threshold value.

In an embodiment, the function and/or mapping is determined based on historical data. Correlations, in the historical data, between (a) the parameters determined at Operation 204 and (b) connectivity problems and/or performance problems are determined. If a correlation between certain values of parameters and certain problems is above a particular threshold, based on the historical data, then a function may be generated or modified to output a threshold value that steers the client device when the parameters reach the certain values.

As an example, the following may be monitored through a historical time period: (a) the RSSI of a link between a client device and a current AP; (b) the RSSI of a link between the client device and a candidate AP; and (c) connectivity problems between the client device and the current AP. The historical data may indicate that there is a particular correlation between (a) the RSSI corresponding to the current AP being below −70 dBm, and (b) a connectivity problem between the client device and the current AP. The particular correlation may be above a threshold. The historical data may indicate that an average difference between (a) the RSSI of the link between the client device and the current AP and (b) the RSSI of the link between the client device and the candidate AP is 10 dB.

Based on the historical data, a function for determining a threshold value, for steering the client device, may be generated. The function may output a threshold value of 9 dB, if the RSSI corresponding to the current AP reaches −68 dBm. Based on the function, the client device would be steered to the candidate AP, if the RSSI corresponding to the current AP reaches −68 dBm. Hence, the RSSI corresponding to the current AP does not reach −70 dBm, and a connectivity problem between the client device and the current AP may be avoided.

Since the threshold value is determined based on one or more parameters associated with the current AP, the candidate AP, and/or the client device, different threshold values may be determined for each client device, each AP serving as the current AP, and/or each AP serving as the candidate AP.

In an embodiment, a learning model is used to generate, modify, and/or update a function for determining a threshold value for steering a client device. The learning model may be implemented using neural networks, support vector machines (SVM), or other methods. The learning model monitors a state of the wireless environment, including input parameters for the function for determining the threshold value. The learning model records past decisions, the criteria used to make the past decisions (such as, the parameters, the value of parameters, and the determined threshold value), and the output come of the past decisions (such as, the actual level of improvement in the link quality metric after steering was performed). The learning model accepts information indicating whether the past decisions were correct. Information indicating whether past decisions were correct may be based on user input. Additionally or alternatively, information indicating whether past decisions were correct may be based on past connectivity and/or performance problems. Based on the information above, the learning model adjusts the function in order to output threshold values that steers the client device in the appropriate cases. The modified function may include different weights to be applied to the input parameters. The modified function may include different input parameters. The modified function from the learning model may be updated periodically, on-demand, or in an event-driven manner, for determining a threshold value to be used in a steering decision.

One or more embodiments include determining a link quality metric corresponding to a link between the current AP and the client device (Operation 208). The link quality metric may be determined as a function of the RSSI, SNR, and/or other factors, as described above in Section 2, titled "Architectural Overview." The function may be a weighted combination of the factors. Different weights may be applied to different factors.

The weight applied to a particular factor may be determined based on a particular parameter. As an example, a particular factor may be a voice performance of a client device. The weight applied to the voice performance may be determined based on whether the client device is currently executing an application that utilizes audio and/or video. Additionally or alternatively, the weight applied to the voice performance may be determined based on the likelihood that the client device is executing an application that utilizes audio and/or video. The likelihood that the client device is executing an application that utilizes audio and/or video, in general or during a particular time window, may be determined based on historical data.

Additionally or alternatively, one or more link quality metrics corresponding to other links in the wireless environment may be determined. An aggregated link quality metric may be determined by combining the link quality metric of the link between the current AP and the client devices and the link quality metrics of other links in the wireless environment.

One or more embodiments include determining a link quality metric corresponding to a link between the candidate AP and the client device (Operation 210). Determining a link quality metric is described above with reference to Operation 208.

Additionally or alternatively, one or more link quality metrics corresponding to other links in the wireless environment, as if the client device is steered to associate with the candidate AP, may be determined. As an example, during a current time period, a client device may be associated with a current AP. A link quality metric may be a client load of the current AP. During the current time period, a client load of the current AP may be three, indicating that three client devices are associated with the current AP. A client load of the current AP, as if the client device is steered to a candidate AP, may be determined. If the client device is steered to the candidate AP, then the number of client devices associated with the current AP would be reduced to two. Hence, the client load of the current AP, as if the client device is steered to the candidate AP, would be two. Further, an aggregated link quality metric may be determined by combining the link quality metrics of other links, as if the client device is steered to the candidate AP.

One or more embodiments include determining whether a difference between (a) the link quality metric determined at Operation 208 and (b) the link quality metric determined at Operation 210 is greater than the threshold value (Operation 212). The link quality metric of the link between the client device and the current AP is subtracted from the link quality metric of the link between the client device and the candidate AP. The difference represents an improvement in the link quality metric corresponding to a wireless connection of the client device, if the client device is steered from associating with the current AP to associating with the candidate AP. The difference is compared to the threshold value.

Additionally or alternatively, a difference between (a) the link quality metric of another link in the wireless environment during the current time period and (b) the link quality metric of the other link as if the client device is steered to the candidate AP is determined. The difference is compared to threshold value.

Additionally or alternatively, a difference between (a) the aggregated link quality metric during the current time period and (b) the aggregated link quality metric as if the client device is steered to the candidate AP is determined. The difference is compared to the threshold value.

If the difference between the link quality metrics is greater than the threshold value, then the client device is steered to associate with the candidate AP instead of the current AP (Operation 214). A request or command may be transmitted, to the client device, to steer the client device from the current AP to the candidate AP. Based on the request or command, the client device transmits a disassociation request to the current AP. The client device transmits an association request to the candidate AP. A process for establishing a wireless connection between the client device and the candidate AP may be initiated. The process may involve completing one or more connection stages, such as an 802.11 association stage, an 802.1x authentication stage, and/or a network address assignment stage.

Additionally or alternatively, the current AP may drop or reject a wireless connection with the client device. The candidate AP may initiate a process to establish a wireless connection with the client device. The process may involve completing one or more connection stages, such as an 802.11 association stage, an 802.1x authentication stage, and/or a network address assignment stage.

If the difference between the link quality metrics is not greater than the threshold value, then a current association between the client device and the current AP is not modified (Operation 218). The client device is not steered to associate with the candidate AP.

In an embodiment, an additional candidate AP may be identified for the client device. Operations 202-218 may be reiterated with respect to the additional candidate AP. At Operation 204, parameters corresponding to the additional candidate AP may be determined. At Operation 206, a threshold value may be determined based on the parameters corresponding to the additional candidate AP. The threshold value may be used for determining whether to steer the client device from the current AP to the additional candidate AP.

In one or more embodiments, a steering decision, for a particular client device, a particular current AP, and a particular candidate AP, may involve multiple threshold values. Operations 204-206 may be used for determining each threshold value, using the same or different parameters. After determining the multiple threshold values, an improvement in a first link quality metric involving a first set of factors (such as, RSSI and MCS rate) may be compared to a first threshold value. An improvement in a second link quality metric involving a second set of factors (such as, client load of an AP) may be compared to a second threshold value. The multiple threshold values may be considered in combination for determining whether to steer the particular client device from the particular current AP to the particular candidate AP.

The steering decision may be made based on various weights corresponding to the multiple threshold values. As an example, Client X may be currently associated with AP Y. There may be two threshold values for determining whether to steer Client X to AP Z. A first threshold value may be the minimum improvement for a first link quality metric (e.g., RSSI). The first threshold value may be 10 dB. The second threshold value may be the minimum improvement for a second link quality metric (e.g., client load of AP Y). The second threshold value may be 1. A weight corresponding to a first threshold value may be 60%, and a weight corresponding to a second threshold value may be 40%.

Continuing the example, an improvement in the first link quality metric, if Client X were steered from AP Y to AP Z, may be determined. The improvement in the first link quality metric may be 8 dB. The first link quality metric is below the first threshold value. Additionally, an improvement in the second link quality metric, if Client X were steered from AP Y to AP Z, may be determined. The improvement in the second link quality metric may be 2. The second link quality metric is above the second threshold value.

Continuing the example, a numeric value representing the comparison between each link quality metric and each threshold value may be determined. Since the first link quality metric is below the first threshold value, a numeric value of negative one (−1) may be assigned. Since the second link quality metric is above the second threshold value, a numeric value of positive one (1) may be assigned. The weights corresponding to each threshold value may be applied to the numeric values, as follows: (60%×numeric value corresponding to the first threshold value)+(40%× numeric value corresponding to the second threshold value). The formula may be computed as: 60%×(−1)+40%×1=−0.2. Since a negative number results after the application of the weights, it may be determined that Client X is not to be steered from AP Y to AP Z.

Additionally or alternatively, the steering decision may be made based on a ranking of the multiple threshold values. As an example, two threshold values may be used for determining whether to steer Client X from AP Y to AP Z. A first threshold value may be ranked prior to a second threshold value. A first link quality metric, corresponding to the first threshold value, is first determined. If an improvement in the first link quality metric is greater than the first threshold value, then Client X is steered from AP Y to AP Z, without checking the second threshold value. However, if an improvement in the first link quality metric is less than the first threshold value, then the second threshold value needs to be checked. A second link quality metric, corresponding to the second threshold value, is determined. If an improvement in the second link quality metric is greater than the second threshold value, then Client X is steered from AP Y to AP Z. If an improvement in the second link quality metric is less than the second threshold value, then Client X is not steered from AP Y to AP Z.

Additionally or alternatively, the steering decision may be made based on satisfying each of the multiple threshold values. As an example, two threshold values may be used for determining whether to steer Client X from AP Y to AP Z. In order for Client X to be steered from AP Y to AP Z, both criteria must be met: (a) an improvement in a first link quality metric must be greater than the first threshold value, and (b) an improvement in a second link quality metric must be greater than the second threshold value.

4. Example Embodiments

A detailed example is described below for purposes of clarity. Components and/or operations described below should be understood as one specific example which may not be applicable to certain embodiments. Accordingly, components and/or operations described below should not be construed as limiting the scope of any of the claims. FIGS. 3A-7 illustrate examples of determining a threshold value based on various parameters, in accordance with one or more embodiments.

4.1 Using a Performance Parameter to Determine a Threshold Value

Figure 3A:
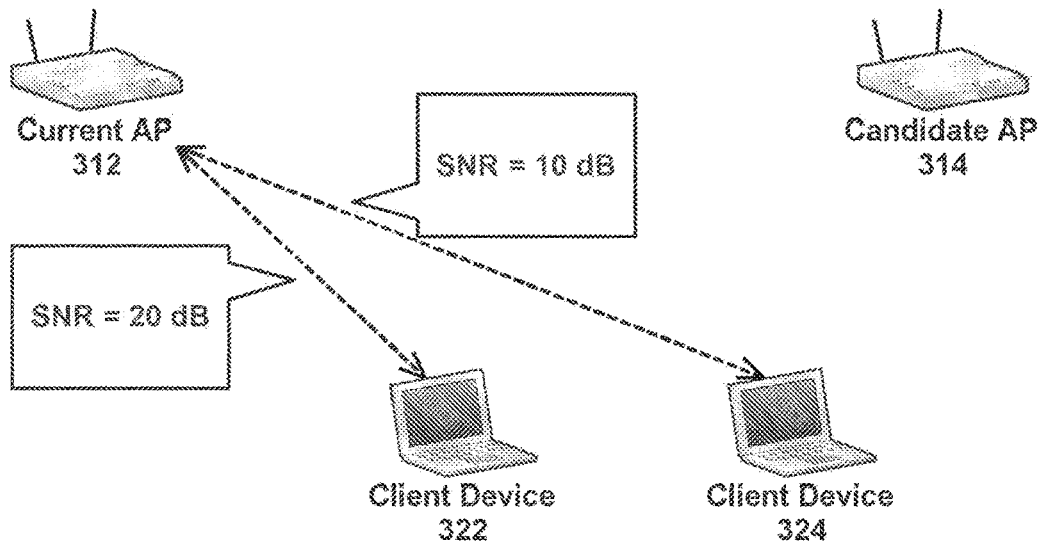
FIGS. 3A-3C illustrate an example for determining a threshold value based on a performance parameter, in accordance with one or more embodiments.
Figure 3B:
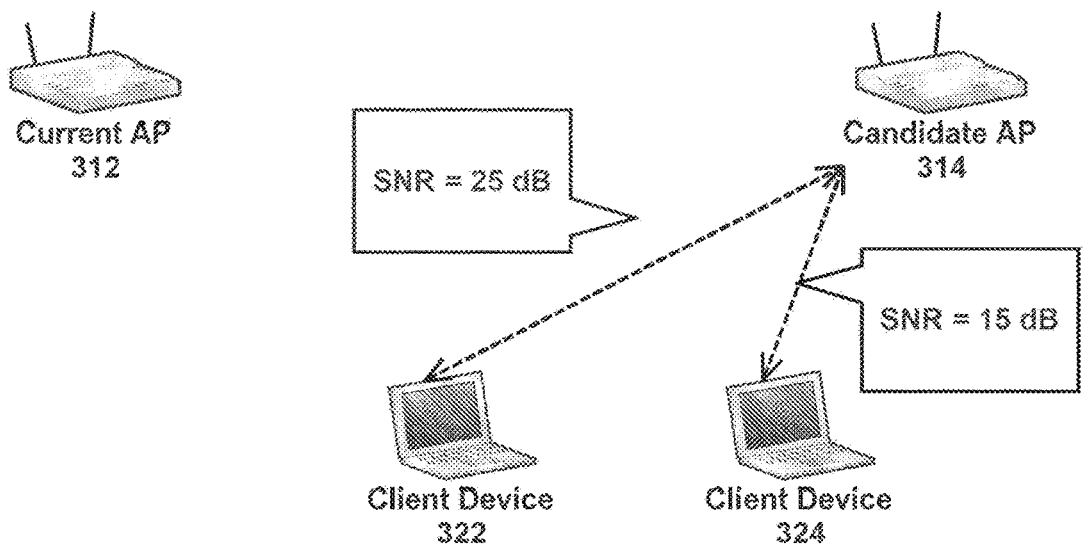
Figure 3C:
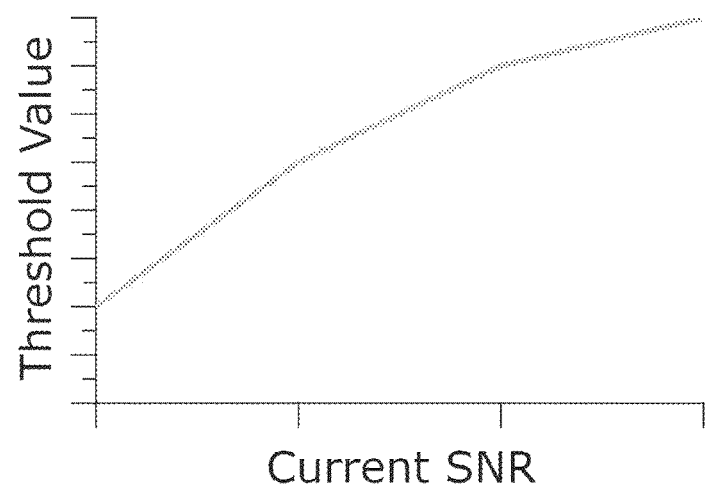

FIGS. 3A-3C illustrate an example for determining a threshold value based on a performance parameter, in accordance with one or more embodiments. In this example, a client device is switched from associating with current AP 312 to candidate AP 314 if the switch would improve an SNR (or another link quality metric) corresponding to a wireless connection of the client device by at least a threshold value. The threshold value is determined as a function of a current value of an SNR (or another performance parameter) of one or more wireless signals exchanged between the client device and current AP 312.

Client devices 322-324 are currently associated with current AP 312. As illustrated in FIG. 3A, an SNR of wireless signals, transmitted from client device 322, detected at current AP 312 is 20 dB. An SNR of wireless signals, transmitted from client device 324, detected at current AP 312 is 10 dB. Also, as illustrated in FIG. 3B, an SNR of wireless signals, transmitted from client device 322, detected at candidate AP 314 is 25 dB. An SNR of wireless signals, transmitted from client device 324, detected at candidate AP 314 is 15 dB.

As mentioned above, the threshold value is a function of a current SNR of wireless signals, transmitted from a client device, detected at current AP 312. As an example, FIG. 3C illustrates a graph of the function. As shown, the threshold value increases as the current SNR increases.

Based on the SNR of 20 dB of the link between client device 322 and current AP 312, the threshold value for client device 322 is determined as 9 dB. Hence, client device 322 is switched from associating with current AP 312 to candidate AP 314 if a difference between (a) an SNR corresponding to a link between client device 322 and candidate AP 314 and (b) an SNR corresponding to a link between client device 322 and current AP 312 is at least 9 dB.

Similarly, based on the SNR of 10 dB of the link between client device 324 and current AP 312, the threshold value for client device 324 is determined as 4 dB. Hence, client device 324 is switched from associating with current AP 312 to candidate AP 314 if a difference between (a) an SNR corresponding to a link between client device 324 and candidate AP 314 and (b) an SNR corresponding to a link between client device 324 and current AP 312 is at least 4 dB.

The difference between (a) an SNR corresponding to a link between client device 322 and candidate AP 314 and (b) an SNR corresponding to a link between client device 322 and current AP 312 is 5 dB (which is, 25 dB-20 dB). The difference is less than the threshold value for client device 322, which is 9 dB. Therefore, client device 322 is not switched from associating with current AP 312 to candidate AP 314.

The difference between (a) an SNR corresponding to a link between client device 324 and candidate AP 314 and (b) an SNR corresponding to a link between client device 324 and current AP 312 is 5 dB (which is, 15 dB-10 dB). The difference is greater than the threshold value for client device 324, which is 4 dB. Therefore, client device 324 is switched from associating with current AP 312 to candidate AP 314.

As shown in this example, the improvement in the SNR of client device 322 and the improvement in the SNR of client device 324 are the same (that is, 5 dB). However, client device 322 remains associated with current AP 312, while client device 324 is switched to associating with candidate AP 314. Client device 324 is steered while client device 322 is not because (a) the threshold value is a function of the current SNR corresponding to the client device, and (b) the current SNR corresponding to client device 324 is less than the current SNR corresponding to client device 322.

4.2 Using Radio Frequency (RF) Density to Determine a Threshold Value

Figure 4:
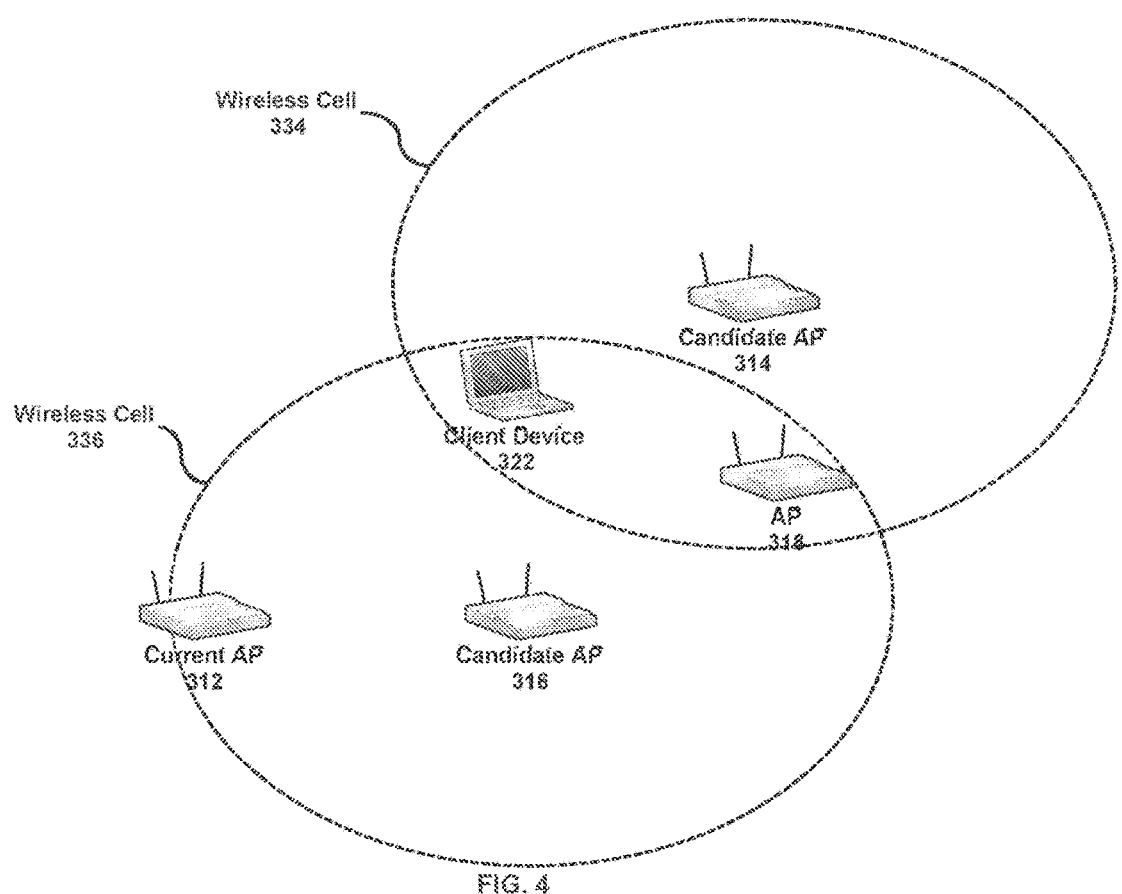
FIG. 4 illustrates an example for determining a threshold value based on a radio frequency (RF) density of an access point, in accordance with one or more embodiments.

FIG. 4 illustrates an example for determining a threshold value based on a radio frequency (RF) density of an access point, in accordance with one or more embodiments. In this example, client device 322 is switched from associating with current AP 312 to a candidate AP if the switch would improve an SNR (or another link quality metric) corresponding to a wireless connection of client device 322 by at least a threshold value. The threshold value is determined as a function of an RF density of the candidate AP.

Client device 322 is currently associated with current AP 312. There are two candidate APs 314-316.

As illustrated in FIG. 4, wireless cell 334 corresponds to candidate AP 314. Wireless cell 334 represents a physical space within which a wireless device would detect a wireless signal transmitted by candidate AP 314, at or above a particular SNR (or another link quality metric). Wireless cell 334 may be spherical or any other shape. The RF density of candidate AP 314 is the number of APs within wireless cell 334. Since AP 318 is within wireless cell 334, the RF density of candidate AP 314 is one.

Similarly, wireless cell 336 corresponds to candidate AP 316. Wireless cell 336 represents a physical space within which a wireless device would detect a wireless signal transmitted by candidate AP 316, at or above a particular SNR (or another link quality metric). The RF density of candidate AP 316 is the number of APs within wireless cell 336. Since current AP 312 and AP 318 are within wireless cell 336, the RF density of candidate AP 316 is two.

An SNR of wireless signals, transmitted from client device 322, detected at current AP 312 is 8 dB. An SNR of wireless signals, transmitted from client device 322, detected at candidate AP 314 is 10 dB. An SNR of wireless signals, transmitted from client device 322, detected at candidate AP 316 is the same, which is 10 dB.

As mentioned above, the threshold value is a function of a RF density of the candidate AP. In an example, the threshold value may be a function of the difference between (a) a RF density of the candidate AP and (b) a RF density of current AP 312. Based on the RF density of candidate AP 314 of one, the threshold value for switching to candidate AP 314 is determined as 30%. Hence, client device 322 is switched from associating with current AP 312 to candidate AP 314 if the SNR corresponding to a wireless connection of client device 322 would be improved by at least 20%.

Similarly, based on the RF density of candidate AP 316 of two, the threshold value for switching to candidate AP 316 is determined as 20%. Hence, client device 322 is switched from associating with current AP 312 to candidate AP 316 if the SNR corresponding to a wireless connection of client device 322 would be improved by at least 30%.

The improvement of the SNR from associating with current AP 312 to associating with candidate AP 316 is 25% (which is $$\frac{10 \text{ dB} - 8 \text{ dB}}{8 \text{ dB}} \times 100).$$

The improvement is less than the threshold value for switching to candidate AP 316, which is 30%. Therefore, client device 322 is not switched from associating with current AP 312 to candidate AP 316.

The improvement of the SNR from associating with current AP 312 to associating with candidate AP 314 is 25% (which is $$\frac{10 \text{ dB} - 8 \text{ dB}}{8 \text{ dB}} \times 100).$$

The improvement is greater than the threshold value for switching to candidate AP 314, which is 20%. Therefore, client device 322 is switched from associating with current AP 312 to candidate AP 314.

As shown in this example, the improvement in the SNR in switching to candidate AP 314 and the improvement in the SNR in switching to candidate AP 316 are the same (that is, 25%). However, client device 322 is switched to candidate AP 314 rather than candidate AP 316, because (a) a threshold value is determined based on the RF density of the candidate AP, and (b) the RF density of candidate AP 314 is less than the RF density of candidate AP 316.

4.3 Using a Client Load to Determine a Threshold Value

Figure 5:
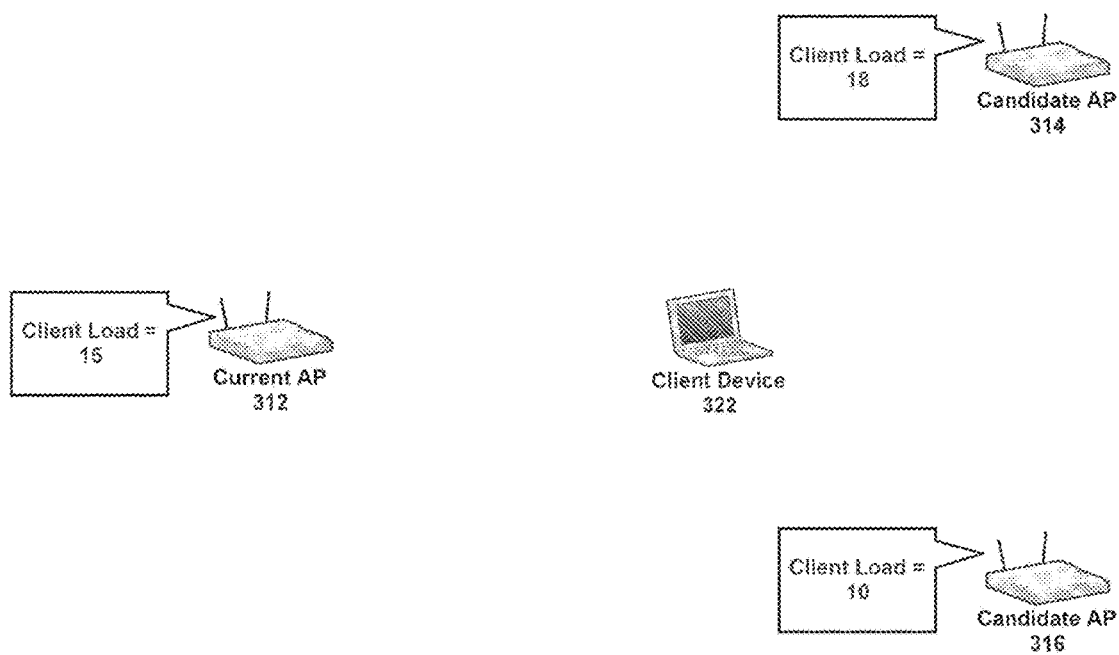
FIG. 5 illustrates an example for determining a threshold value based on a client load of an access point.

FIG. 5 illustrates an example for determining a threshold value based on a client load of an access point. In this example, client device 322 is switched from associating with current AP 312 to a candidate AP if the switch would improve an SNR (or another link quality metric) corresponding to a wireless connection of client device 322 by at least a threshold value. The threshold value is determined as a function of a client load of the candidate AP. A client load of an AP may be represented as a number of client devices associated with the AP, or a sum of performance parameters corresponding to wireless connections of client devices associated with the AP.

Client device 322 is currently associated with current AP 312. There are two candidate APs 314-316. As illustrated in FIG. 5, a client load of current AP 312 is 15. A client load of candidate AP 314 is 18. A client load of candidate AP 316 is 10.

An SNR of wireless signals, transmitted from client device 322, detected at current AP 312 is 8 dB. An SNR of wireless signals, transmitted from client device 322, detected at candidate AP 314 is 10 dB. An SNR of wireless signals, transmitted from client device 322, detected at candidate AP 316 is the same, which is 10 dB.

As mentioned above, the threshold value is a function of a client load of the candidate AP. In an example, the threshold value may be a function of the difference between (a) a client load of the candidate AP and (b) a client load of current AP 312. Based on the client load of 18, corresponding to candidate AP 314, the threshold value for switching to candidate AP 314 is determined as 30%. Based on the client load of 10, corresponding to candidate AP 316, the threshold value for switching to candidate AP 316 is determined as 20%.

The improvement of the SNR from associating with current AP 312 to associating with candidate AP 314 is 25% (which is $$\frac{10 \text{ dB} - 8 \text{ dB}}{8 \text{ dB}} \times 100).$$

The improvement is less than the threshold value for switching to candidate AP 314, which is 30%. Therefore, client device 322 is not switched from associating with current AP 312 to candidate AP 314.

The improvement of the SNR from associating with current AP 312 to associating with candidate AP 316 is 25% (which is $$\frac{10 \text{ dB} - 8 \text{ dB}}{8 \text{ dB}} \times 100).$$

The improvement is greater than the threshold value for switching to candidate AP 316, which is 20%. Therefore, client device 322 is switched from associating with current AP 312 to candidate AP 316.

As shown in this example, the improvement in the SNR in switching to candidate AP 314 and the improvement in the SNR in switching to candidate AP 316 are the same (that is, 25%). However, client device 322 is switched to candidate AP 316 rather than candidate AP 314, because (a) the threshold value is determined based on a client load of the candidate AP, and (b) a client load of candidate AP 316 is less than a client load of candidate AP 314.

4.4 Using a Time of Day to Determine a Threshold Value

Figure 6A:
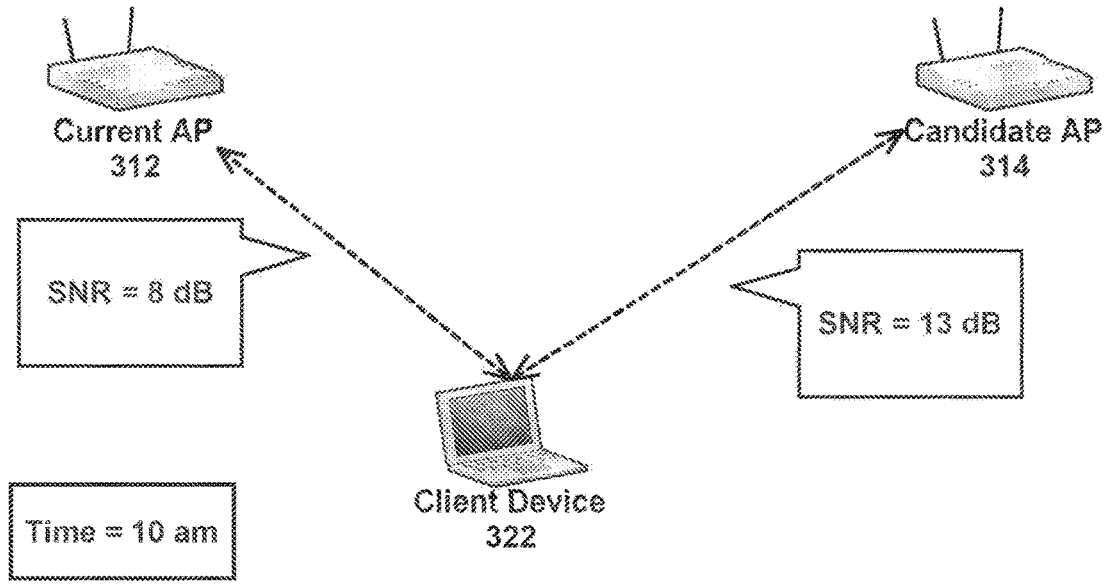
FIGS. 6A-6B illustrate an example for determining a threshold value based on a particular time period.
Figure 6B:
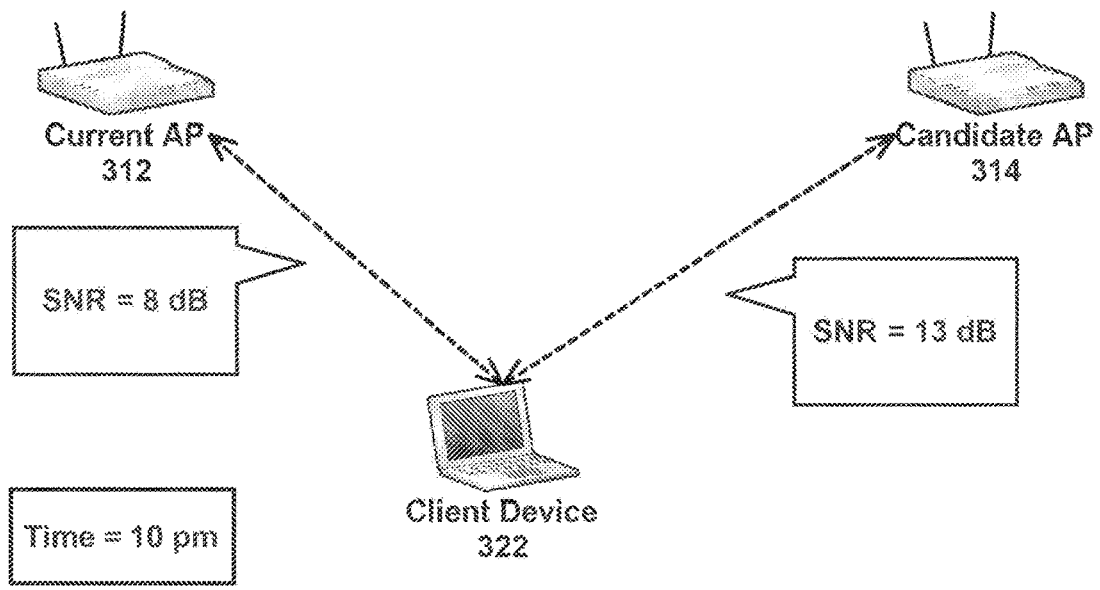

FIGS. 6A-6B illustrate an example for determining a threshold value based on a particular time period. In this example, client device 322 is switched from associating with current AP 312 to candidate AP 314 if the switch would improve an SNR (or another link quality metric) corresponding to a wireless connection of client device 322 by at least a threshold value. The threshold value is determined as a function of the time of day.

At 10 a.m., client device 322 is associated with current AP 312. As illustrated in FIGS. 4A and 4B, the SNRs corresponding to client device 322 at 10 a.m. and at 10 p.m. are the same. An SNR of wireless signals, transmitted from client device 322, detected at current AP 312 is 8 dB. An SNR of wireless signals, transmitted from client device 322, detected at candidate AP 314 is 13 dB.

As mentioned above, the threshold value is a function of the time of day. Based on a time of 10 a.m., the threshold value is determined as 9 dB. Based on a time of 10 p.m., the threshold value is determined as 4 dB.

The difference between (a) an SNR corresponding to a link between client device 322 and candidate AP 314 and (b) an SNR corresponding to a link between client device 322 and current AP 312 is 5 dB (which is, 13 dB-8 dB).

The difference is less than the threshold value for 10 a.m., which is 9 dB. Therefore, client device 322 is not switched from associating with current AP 312 to candidate AP 314 at 10 a.m. Client device 322 remains associated with current AP 312 at 10 a.m.

The difference is greater than the threshold value for 10 p.m., which is 4 dB. Therefore, client device 322 is switched from associating with current AP 312 to candidate AP 314 at 10 p.m.

As shown in this example, the improvement in the SNR, if switched to candidate AP 314, at 10 a.m. and at 10 p.m. are the same (that is, 5 dB). However, client device 322 is switched to candidate AP 314 at 10 p.m. but not at 10 a.m., because the threshold value is lower at 10 p.m. than at 10 a.m.

4.5 Using a Device Type of a Client Device to Determine a Threshold Value

Figure 7:
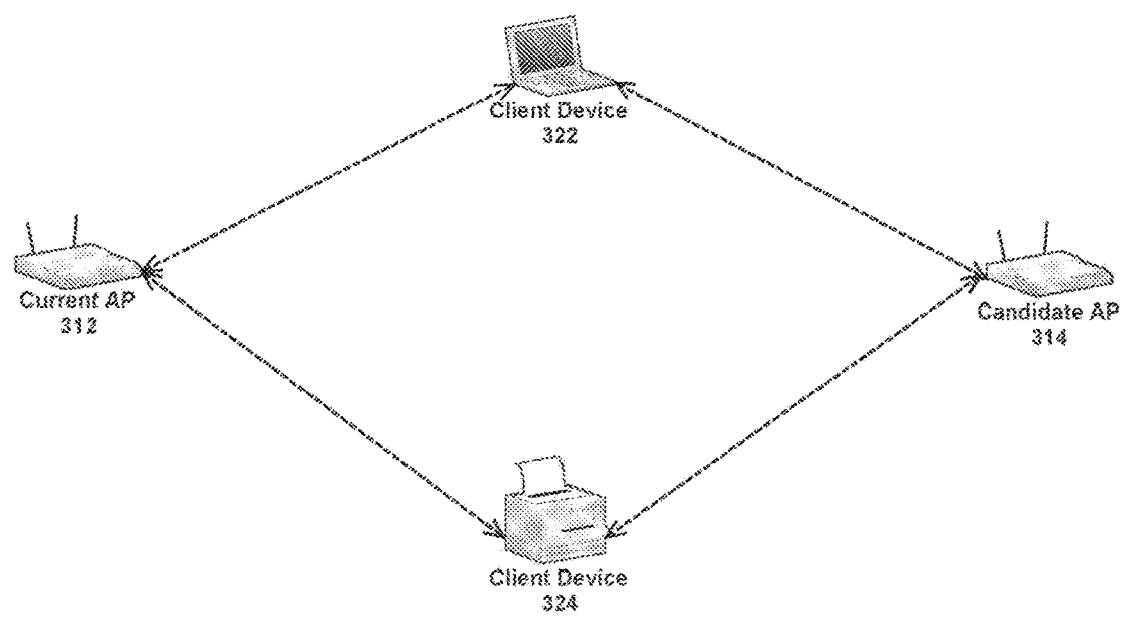
FIG. 7 illustrates an example for determining a threshold value based on a device type of a client device.

FIG. 7 illustrates an example for determining a threshold value based on a device type of a client device. In this example, a client device is switched from associating with current AP 312 to candidate AP 314 if the switch would improve an SNR (or another link quality metric) corresponding to a wireless connection of the client device by at least a threshold value. The threshold value is determined as a function of the type of the client device.

Client devices 322-324 are currently associated with current AP 312. As illustrated in FIG. 7, client device 322 is a laptop, and client device 324 is a printer.

An SNR of wireless signals, transmitted from client device 322, detected at current AP 312 is 8 dB. An SNR of wireless signals, transmitted from client device 324, detected at current AP 312 is the same, which is 8 dB.

An SNR of wireless signals, transmitted from client device 322, detected at candidate AP 314 is 14 dB. An SNR of wireless signals, transmitted from client device 324, detected at candidate AP 314 is the same, which is 14 dB.

As mentioned above, the threshold value is a function of the type of the client device. A set of rules maps device types to threshold values. The set of rules may have been determined based on whether the device type corresponds to a stationary device or a mobile device. Since a laptop is a mobile device, the laptop device type may correspond to a higher threshold value. Since a printer is a stationary device, the printer device type may correspond to a lower threshold value.

Based on a device type of laptop, the threshold value for client device 322 is determined as 9 dB. Similarly, based on a device type of printer, the threshold value for client device 324 is determined as 4 dB.

The difference between (a) an SNR corresponding to a link between client device 322 and candidate AP 314 and (b) an SNR corresponding to a link between client device 322 and current AP 312 is 6 dB (which is, 14 dB-8 dB). The difference is less than the threshold value for a device type of laptop, which is 9 dB. Therefore, client device 322 is not switched from associating with current AP 312 to candidate AP 314.

The difference between (a) an SNR corresponding to a link between client device 324 and candidate AP 314 and (b) an SNR corresponding to a link between client device 324 and current AP 312 is 6 dB (which is, 14 dB-8 dB). The difference is greater than the threshold value for a device type of printer, which is 4 dB. Therefore, client device 324 is switched from associating with current AP 312 to candidate AP 314.

As shown in this example, the improvement in the SNR corresponding to client device 322 and the improvement in the SNR corresponding to client device 324 are the same (that is, 6 dB). However, client device 322 remains associated with current AP 312, while client device 324 is switched to associating with candidate AP 314, because the threshold value for a printer is lower than the threshold value for a laptop.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
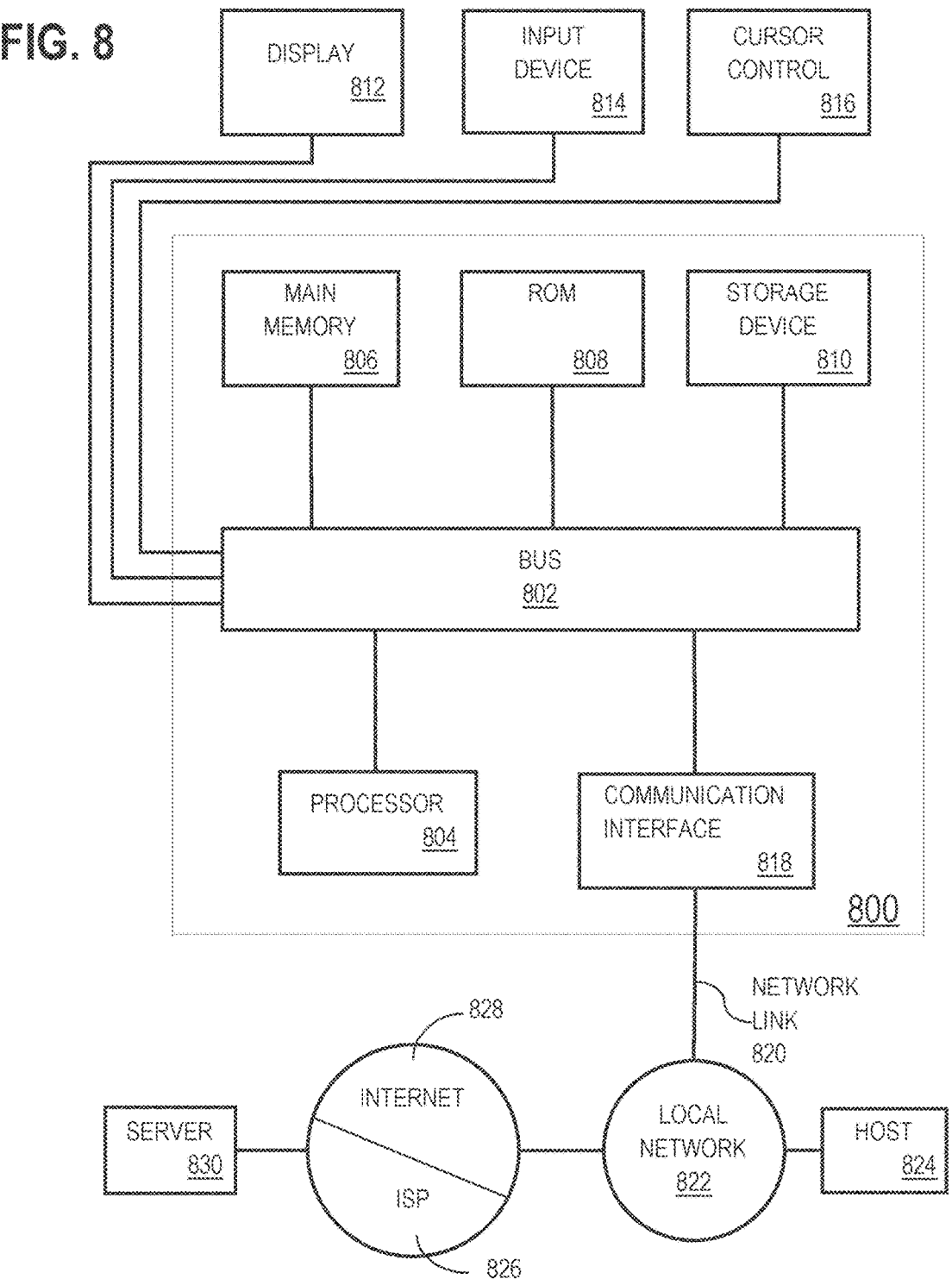
FIG. 8 shows a block diagram that illustrates a computer system in accordance with one or more embodiments.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A non-transitory computer readable medium comprising instructions which when executed cause performance of operations comprising:
   identifying, in a wireless environment, a first node, a second node, and a third node, the first node being associated with the second node, and the first node wirelessly communicating with the second node over a first link;

determining a particular value for a parameter that is associated with at least one of: the first node, the second node, the third node, and the wireless environment;

determining, based on the particular value for the parameter, a threshold value for a minimum improvement in quality from the first link between the first node and the second node to a second link between the first node and the third node;

wherein the threshold value is used to determine whether to cause the first node to associate with the third node instead of the second node;

wherein the first node continues to associate with the second node, based on the threshold value, in order to wirelessly communicate with the second node;

determining an updated value for the parameter;

determining, based on the updated value for the parameter, an updated threshold value for the minimum improvement in quality from the first link between the first node and the second node to the second link between the first node and the third node;

wherein the updated threshold value is used to determine whether to cause the first node to associate with the third node instead of the second node;

wherein the first node associates with the third node, based on the updated threshold value, in order to wirelessly communicate with the third node.

2. The medium of claim 1, wherein the parameter comprises a performance parameter of the first link between the first node and the second node.

3. The medium of claim 2, wherein the performance parameter comprises at least one of: a received signal strength and a signal-to-noise ratio (SNR).

4. The medium of claim 1, wherein the parameter comprises a performance parameter of the second link between the first node and the third node.

5. The medium of claim 1, wherein the parameter comprises a radio frequency (RF) density of the second node or the third node.

6. The medium of claim 1, wherein the parameter comprises an operating radio frequency (RF) channel of the first node, the second node, or the third node.

7. The medium of claim 1, wherein the parameter comprises a particular time period in which the first node would be associated with the third node instead of the second node.

8. The medium of claim 1, wherein the parameter comprises a client load of the second node or the third node.

9. The medium of claim 1, wherein the threshold value is determined further based on a second parameter comprising an identity of at least one of: the first node, the second node, and the third node.

10. The medium of claim 1, wherein the threshold value is determined further based on a second parameter comprising a device type of the first node.

11. The medium of claim 1, wherein the threshold value is determined using a function that accepts the particular value for the parameter as an input value, and the function is determined based on historical data associated with connectivity problems or performance problems.

12. The medium of claim 1, wherein the operations further comprise:
detecting a first link quality metric associated with the first link between the first node and the second node;
detecting a second link quality metric associated with the second link between the first node and the third node;
responsive to determining that a difference between the first link quality metric and the second link quality metric is greater than the updated threshold value determined based on the updated value for the parameter:
causing the first node to associate with the third node instead of the second node.

13. The medium of claim 12, wherein the operations further comprise:
prior to determining the updated value for the parameter:
responsive to determining that a second difference between the first link quality metric and the second link quality metric is less than the threshold value determined based on the particular value for the parameter:
refraining from causing the first node to associate with the third node instead of the second node.

14. The medium of claim 1, wherein the first node comprises a client device, the second node comprises a first access point, and the third node comprises a second access point.

15. A system comprising:
at least one device including a hardware processor and a memory storing instructions;
and the system being configured to perform operations by executing the instructions comprising:
identifying, in a wireless environment, a first node, a second node, and a third node, the first node being associated with the second node, and the first node wirelessly communicating with the second node over a first link;
determining a particular value for a parameter that is associated with at least one of: the first node, the second node, the third node, and the wireless environment;
determining, based on the particular value for the parameter, a threshold value for a minimum improvement in quality from the first link between the first node and the second node to a second link between the first node and the third node;
wherein the threshold value is used to determine whether to cause the first node to associate with the third node instead of the second node;
wherein the first node continues to associate with the second node, based on the threshold value, in order to wirelessly communicate with the second node;
determining an updated value for the parameter;
determining, based on the updated value for the parameter, an updated threshold value for the minimum improvement in quality from the first link between the first node and the second node to the second link between the first node and the third node;
wherein the updated threshold value is used to determine whether to cause the first node to associate with the third node instead of the second node;
wherein the first node associates with the third node, based on the updated threshold value, in order to wirelessly communicate with the third node.

16. The system of claim 15, wherein the parameter comprises a performance parameter of the first link between the first node and the second node.

17. The system of claim 15, wherein the operations further comprise:
detecting a first link quality metric associated with the first link between the first node and the second node;
detecting a second link quality metric associated with the second link between the first node and the third node;
responsive to determining that a difference between the first link quality metric and the second link quality metric is greater than the updated threshold value determined based on the updated value for the parameter:

causing the first node to associate with the third node instead of the second node.

18. The medium of claim 17, wherein the operations further comprise:
prior to determining the updated value for the parameter:
responsive to determining that a second difference between the first link quality metric and the second link quality metric is less than the threshold value determined based on the particular value for the parameter:
refraining from causing the first node to associate with the third node instead of the second node.

19. A method comprising:
identifying, in a wireless environment, a first node, a second node, and a third node, the first node being associated with the second node, and the first node wirelessly communicating with the second node over a first link;
determining a particular value for a parameter that is associated with at least one of: the first node, the second node, the third node, and the wireless environment;
determining, based on the particular value for the parameter, a threshold value for a minimum improvement in quality from first link between the first node and the second node to a second link between the first node and the third node;
  wherein the threshold value is used to determine whether to cause the first node to associate with the third node instead of the second node;
  wherein the first node continues to associate with the second node, based on the threshold value, in order to wirelessly communicate with the second node;
determining an updated value for the parameter;
determining, based on the updated value for the parameter, an updated threshold value for the minimum improvement in quality from the first link between the first node and the second node to the second link between the first node and the third node;
  wherein the updated threshold value is used to determine whether to cause the first node to associate with the third node instead of the second node;
  wherein the first node associates with the third node, based on the updated threshold value, in order to wirelessly communicate with the third node;
wherein the method is performed by at least one device including a hardware processor.

20. The method of claim 19, further comprising:
detecting a first link quality metric associated with the first link between the first node and the second node;
detecting a second link quality metric associated with the second link between the first node and the third node;
responsive to determining that a difference between the first link quality metric and the second link quality metric is greater than the updated threshold value determined based on the updated value for the parameter:
causing the first node to associate with the third node instead of the second node.

* * * * *